(12) United States Patent
Kaye et al.

(10) Patent No.: US 12,495,930 B2
(45) Date of Patent: Dec. 16, 2025

(54) FLAT PACK FIRE PIT

(71) Applicants: Zamir Kaye, Ein-Habsor (IL); Oren Atia, Santa Cruz, CA (US)

(72) Inventors: Zamir Kaye, Ein-Habsor (IL); Oren Atia, Santa Cruz, CA (US)

(*) Notice: Subject to any disclaimer, the term of this patent is extended or adjusted under 35 U.S.C. 154(b) by 349 days.

(21) Appl. No.: 18/348,335

(22) Filed: Jul. 6, 2023

(65) Prior Publication Data
US 2025/0009178 A1 Jan. 9, 2025

(51) Int. Cl.
A47J 37/07 (2006.01)

(52) U.S. Cl.
CPC .... *A47J 37/0763* (2013.01); *A47J 2037/0777* (2013.01)

(58) Field of Classification Search
CPC .......................... A47J 37/0763; A47J 37/0777
USPC ......................................................... 126/9 R
See application file for complete search history.

(56) References Cited

U.S. PATENT DOCUMENTS

D896,358 S * 9/2020 Xu ............................... D23/332

FOREIGN PATENT DOCUMENTS

KR 101407213 B1 * 6/2014 .......... A47J 37/0763
KR 20210050160 A * 5/2021 .......... A47J 37/0763

* cited by examiner

*Primary Examiner* — Allen R. B. Schult
*Assistant Examiner* — William C Weinert
(74) *Attorney, Agent, or Firm* — SOQUEL GROUP LLC

(57) ABSTRACT

A flat pack fire pit with six planar walls, each planar wall is trapezoidal in shape and each wall is vertically oriented with a widest side at the top and a smallest side at the bottom, where each wall interconnects with an adjacent wall to form a hexagonal structure, and each wall has a vertically oriented leg slot towards the bottom, including a hexagonal bottom plate that rests in horizontal orientation inside the hexagonal structure near the bottom; and six legs, each leg having a base portion that descends below the hexagonal structure, and a slot portion that protrudes through the leg slot in a corresponding wall, wherein the slot portion has two prongs that fit around an edge of a corresponding side of the bottom plate.

8 Claims, 6 Drawing Sheets

FLAT PACK FIRE PIT

BACKGROUND OF THE INVENTION

Field of the Invention

This invention relates to fire pits typically used for outdoor heating and cooking.

Description of the Related Art

Fire pits that can be collapsed or deconstructed into a flat package for easy transportation and reduced storage footprint may be referred to as flat pack or flat fold fire pits.

Flat pack fire pits differ in terms of the design and type of components and how the components fasten together. They further differ in terms of their size, materials used, use of fasteners and overall design. In addition, some flat pack fire pits offer different accessories or additional features such as grill grates, charcoal grates and mats.

SUMMARY OF THE INVENTION

The subject invention is a flat pack fire pit that can be disassembled into flat pieces for purposes of transportation or storage.

The invention uses a small number of interlocking parts, specifically six walls, six legs and a bottom plate and avoids using fasteners. All the parts lock together such that the fire pit will not disassemble when lifted or moved after assembly. Each part may be fabricated using laser cutting or punch press of sheet metal, with no bending required. Thus, each of the walls and legs and bottom plate are entirely planar, with no folds or bent portions.

In certain embodiments, the invention includes a grill grate that rests on top of the fire pit. Uniquely, the grate has two sides, a left grate half and a right grate half, that interlock.

A flat pack fire pit with six planar walls, each planar wall is trapezoidal in shape and each wall is vertically oriented with a widest side at the top and a smallest side at the bottom, where each wall interconnects with an adjacent wall to form a hexagonal structure, and each wall has a vertically oriented leg slot towards the bottom, including a hexagonal bottom plate that rests in horizontal orientation inside the hexagonal structure near the bottom; and six legs, each leg having a base portion that descends below the hexagonal structure, and a slot portion that protrudes through the leg slot in a corresponding wall, wherein the slot portion has two prongs that fit around an edge of a corresponding side of the bottom plate.

In certain embodiments, three of the walls of the fire pit have two upper slots that descend from the top of the widest side of the trapezoidal wall and the other three walls have two lower slots that ascend from the bottom of the narrowest side of the trapezoidal wall, wherein each wall interconnects with an adjacent wall by interlocking an upper slot of one wall with a lower slot of an adjacent wall

BRIEF DESCRIPTION OF DRAWINGS

Non-limiting and non-exhaustive embodiments of the present invention are described with reference to the following drawings. In the drawings, like reference numerals refer to like parts throughout the various figures unless otherwise specified.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

As used herein the following terms have the meanings given below:

Fire pit—as used herein, refers to a device inside of which a fire can be made.

Flat pack fire pit—as used herein, refers to a fire pit that can be disassembled into flat pieces for purposes of transportation or storage.

Novelty

The objective of fire pit 1 is to use a minimum number of interlocking parts and to avoid using fasteners. In addition, a key feature is that all parts lock together such that the fire pit will not disassemble when lifted or moved after assembly. This offers a number of advantages, in particular it simplifies the assembly and disassembly processes, provides a stable, secure device since all parts snugly interlock, and avoiding fasteners minimizes the risk of losing parts. Additional design aspects include the ability to fabricate each part using laser cutting or punch press of sheet metal, with no bending required.

Flat Pack Fire Pit Detailed Description

Figure 1A:
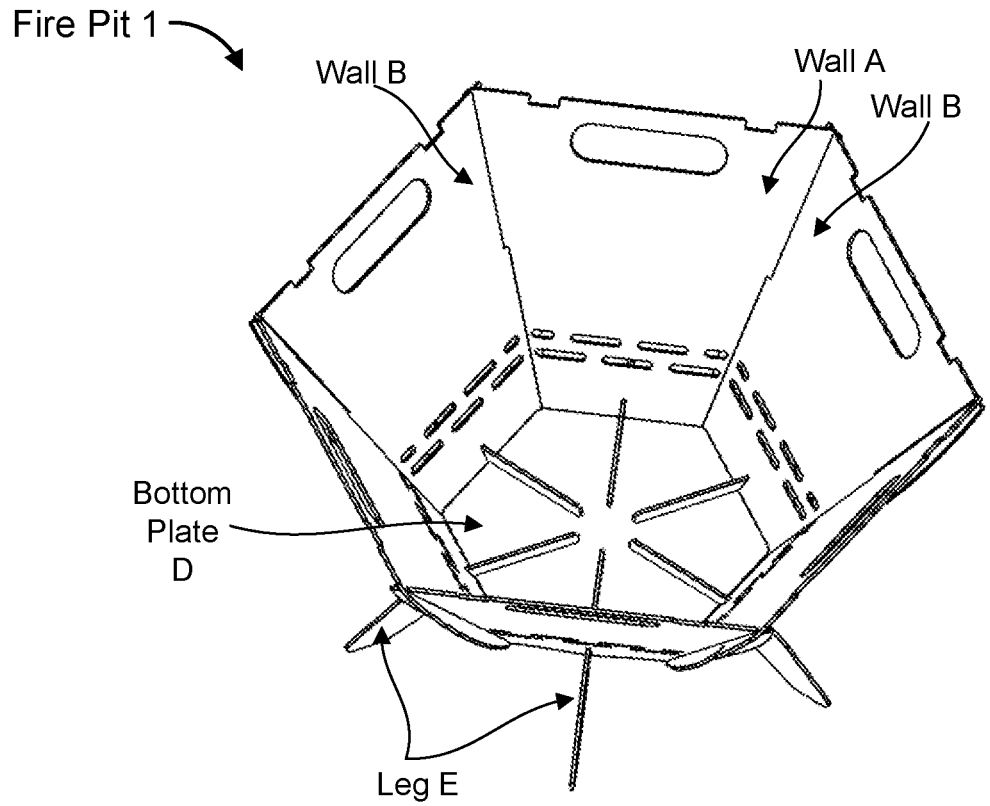
FIG. 1A illustrates an embodiment of a flat pack fire pit seen from above.

FIG. 1A illustrates an embodiment of a flat pack fire pit 1, henceforth fire pit 1, seen from above. Fire pit 1 includes six adjacent, interlocking walls A, B, a bottom plate D, and legs E. Optionally, fire pit 1 also includes a grill grate F, depicted in FIG. 7, that fits on top.

In operation, a fire is made by a user on top of bottom plate D. The fire can be used for the purpose of heating, or by adding grill grate F, described in further detail hereinbelow, it can be used to grill, heat or cook food.

Figure 1B:
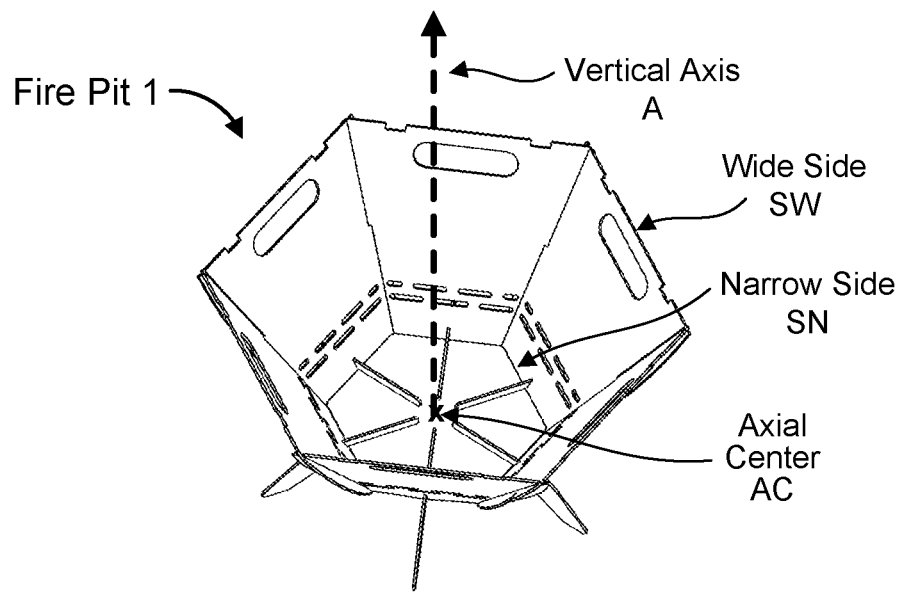
FIG. 1B illustrates the orientation and essential geometry of the fire pit.

FIG. 1B illustrates the orientation and essential geometry of fire pit 1. Fire pit 1 has a central vertical axis A that passes through an axial center AC. Each wall has a nearly identical, roughly trapezoidal, shape. The only difference between the shape of wall A and wall B is the placement of the locking slots as discussed below. When the six sides are assembled, by interlocking sequentially a wall A with a wall B, a three-dimensional structure is formed, referred to herein as a hexagonal structure. Each trapezoidal wall has a wide side SW at the top of the hexagonal structure and the narrow side SN at the bottom; thus, the three-dimensional structure tapers inward from top to bottom. Fire pit 1 is symmetric about vertical axis A that passes through an axial center AC. That is, fire pit 1 appears identical when it is rotated a multiple of 60 degrees (360 degrees/6 sides) to the right or left about vertical axis A.

Figure 2A:
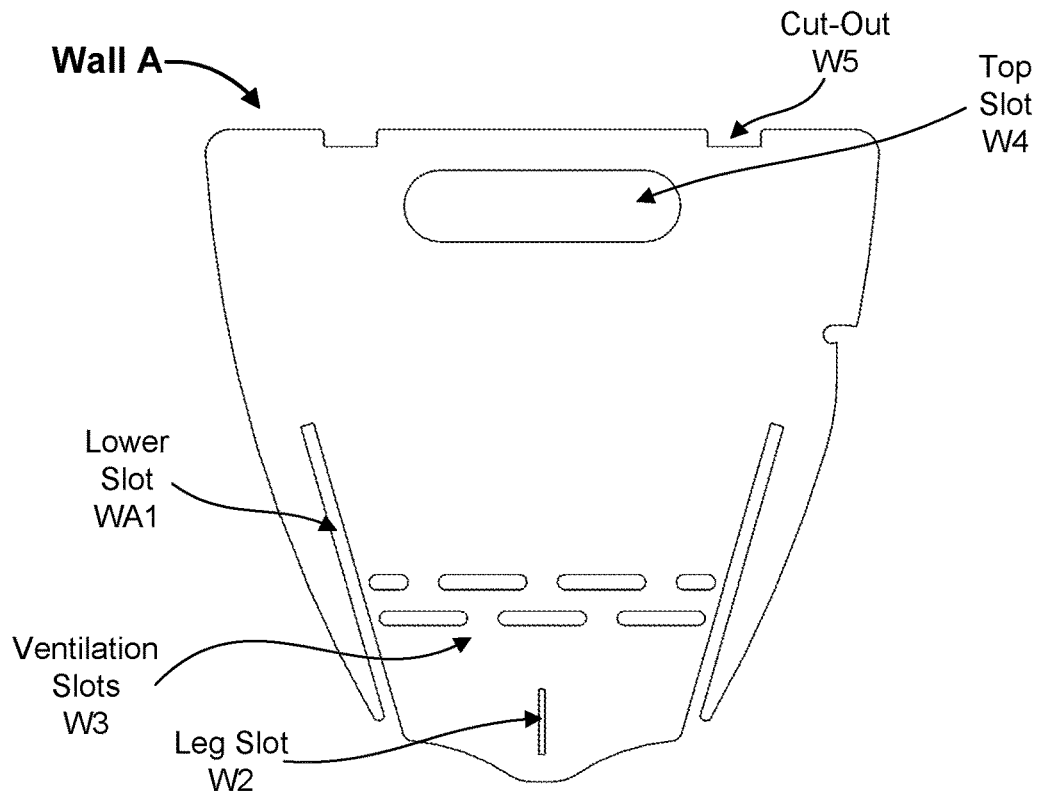
FIG. 2A illustrates a trapezoidal wall of the fire pit that has two lower slots on the narrowest, i.e. bottom, side of the wall.
Figure 2B:
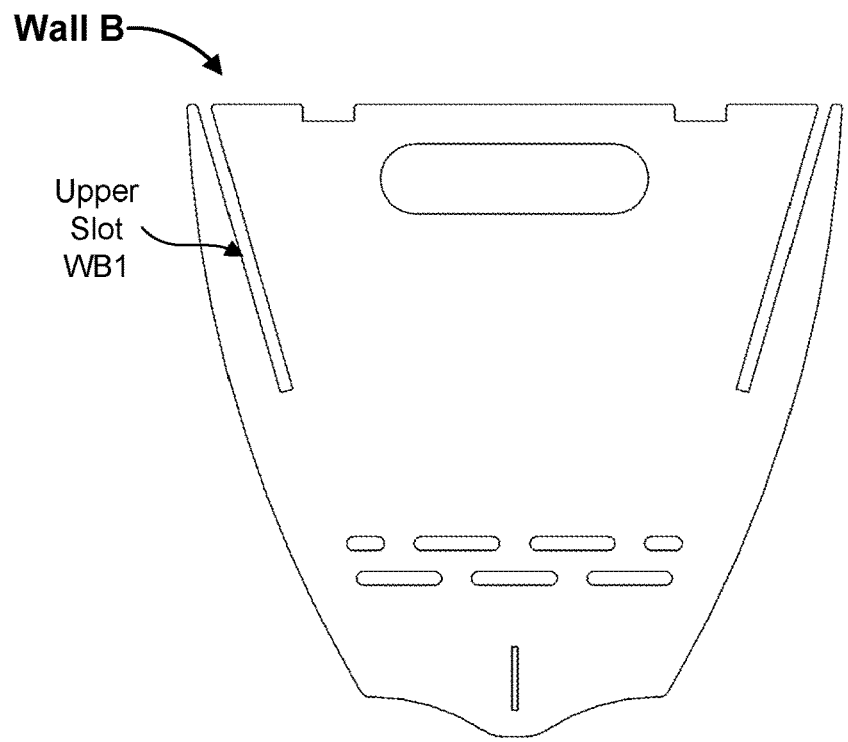
FIG. 2B illustrates a second trapezoidal wall of the fire pit that has two upper slots on the widest, i.e. top, side of the second wall.

FIGS. 2A and 2B depict walls A and B of fire pit 1 which are assembled adjacently and which interlock. There are six walls, three wall A and three wall B.

FIG. 2A illustrates a wall A of fire pit 1 that has two lower slots WA1 that ascend from the lower side of the trapezoidal wall. One lower slot WA1 ascends from the lower left side of the bottom trapezoidal wall and one lower slot WA1 ascends from the lower right side, to assure stability. FIG. 2B illustrates a wall B of fire pit 1 that has two upper slots WB1 that descend from the upper side of the trapezoidal wall. One upper slot WB1 descends from the upper left side of the top trapezoidal wall and one upper slot WB1 descends from the upper right side.

Figure 6:
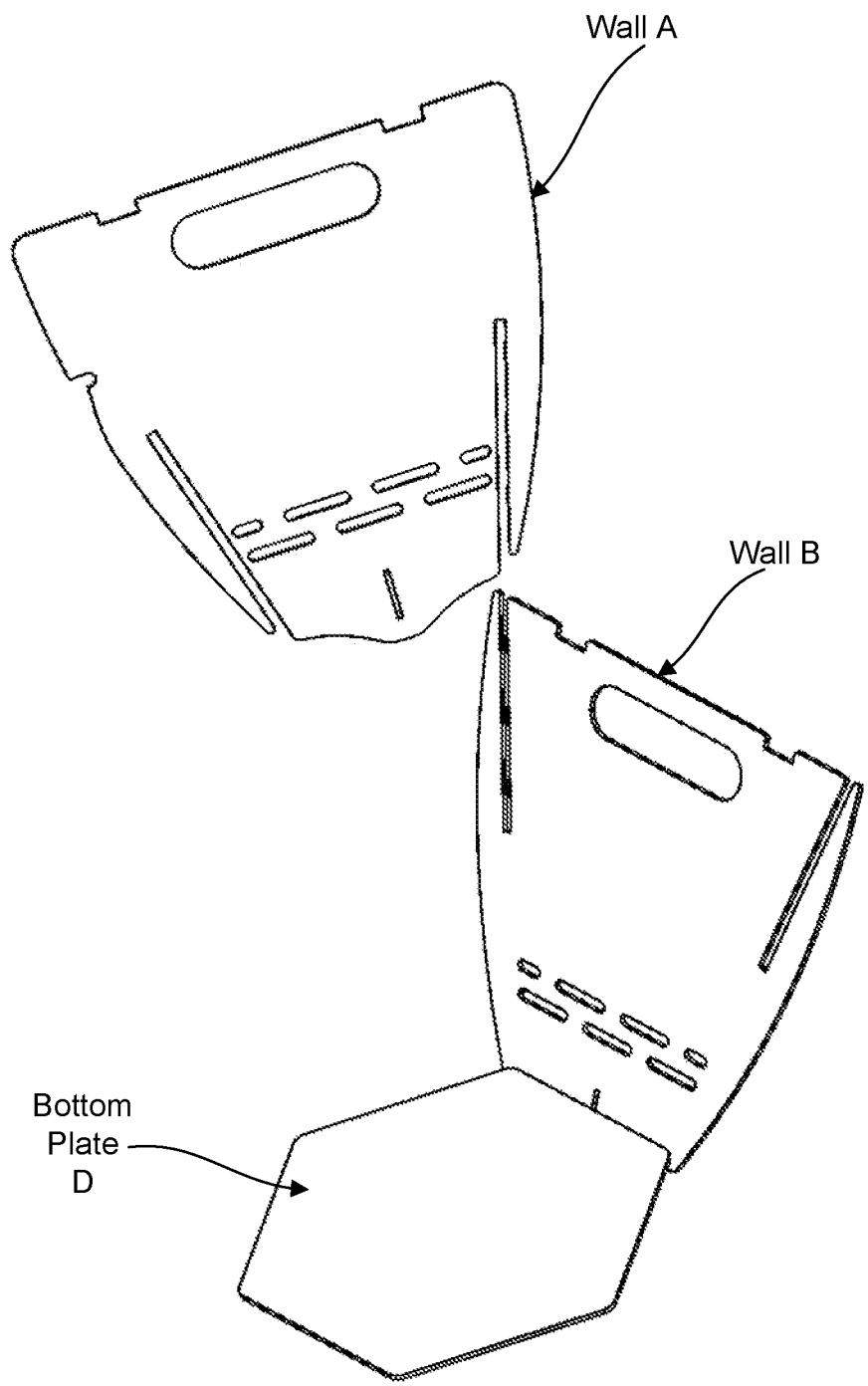
FIG. 6 illustrates how two adjacent walls interlock.

Wall A and Wall B interlock simply by sliding a lower slot WA1 of Wall A into the upper slot WB1 of Wall B as illustrated in FIG. 6 below.

Walls A and B share a number of other features. They include ventilation slots W3, a vertically oriented leg slot W2 in the center towards the bottom that enables a leg E to pass through it, a top slot W4 that can be used to pick up or hold a wall, and cut-out regions, or blanks, W5 that interlock with tabs of a grill grate, as described hereinbelow with reference to FIG. 7. In certain embodiments, top slot W4 is entirely enclosed, i.e. it has no sides or edges that open to the exterior of the wall.

Figure 3:
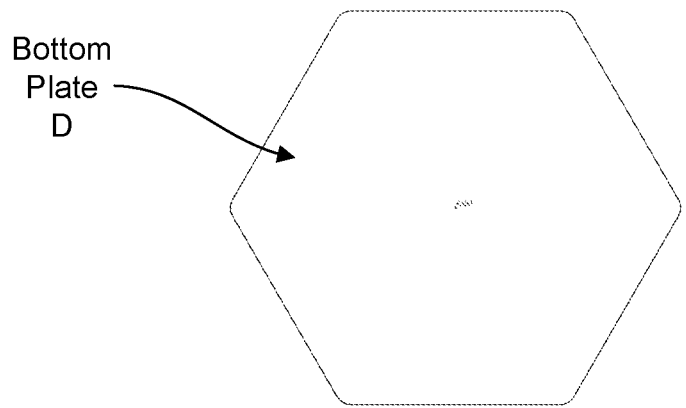
FIG. 3 illustrates a hexagonal bottom plate.

FIG. 3 illustrates a hexagonal bottom plate D. Bottom plate D has a horizontal orientation. In operation, bottom plate D is typically parallel to the ground and coals or wood are placed on top of bottom plate D and then ignited.

Figure 4:
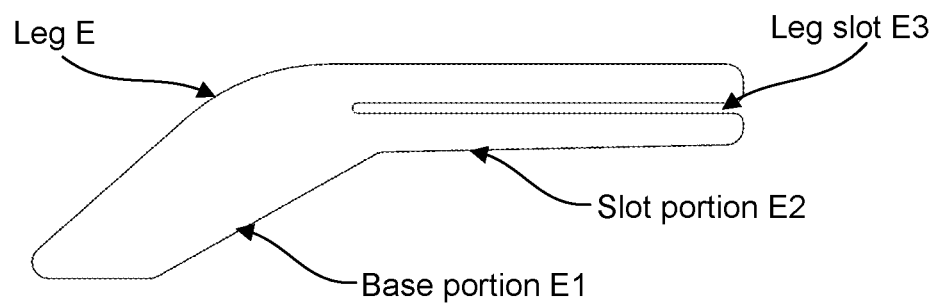
FIG. 4 illustrates a leg which secures one side of the bottom plate.
Figure 5:
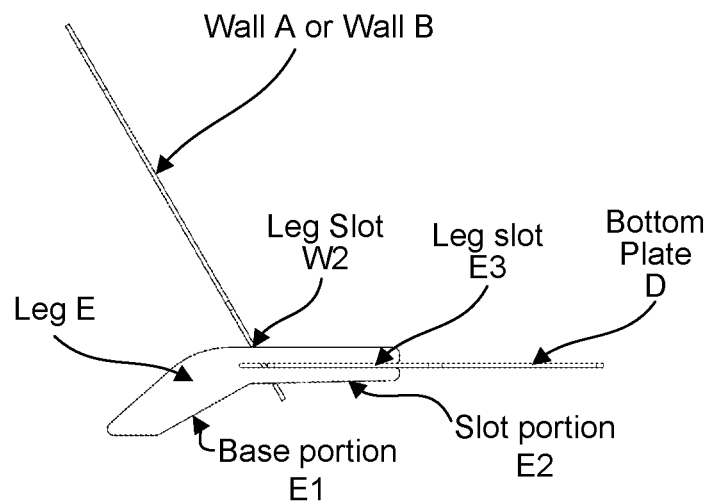
FIG. 5 illustrates how a leg secures the bottom plate.

FIG. 4 illustrates a leg E which secures one side of bottom plate D. Fire pit 1 includes one leg E for each of its six sides. Leg E has a base portion E1 that contacts the ground and elevates bottom plate D off the ground, and a slot portion E2. Slot portion E2 has two prongs, a top prong and lower prong with a space, or open slot, between them that is referred to as leg slot E3. When assembled, leg slot E3 is positioned such that each of the two prongs fits over an outer edge of one side of bottom plate D, as illustrated in FIG. 5. Thus, when assembled each of the six legs E fits and secures a corresponding side of bottom plate D. In certain embodiments, the outer edge of each of the two prongs that make up slot portion E2 are tapered or rounded to enable bottom plate D to be easily inserted.

As illustrated in FIG. 5, slot portion E2 of leg E passes through a leg slot W2 of a wall A or wall B and then interlocks with bottom plate D. The base portion E1 remains largely outside wall A or wall B. The interlocking is accomplished when an outer edge of one side of bottom plate D fits inside a leg slot E3 such that the top of slot portion E2 secures bottom plate D from the top and a lower part of slot portion E2 secures bottom plate D from the bottom.

FIG. 6 illustrates one embodiment of how two adjacent walls interlock. As previously described, wall A and wall B interlock simply by sliding a lower slot WA1 of wall A into the upper slot WB1 of wall B. Other embodiments of interlocking mechanisms may also be used, as described hereinbelow, with departing from the scope of the subject invention.

Figure 7:
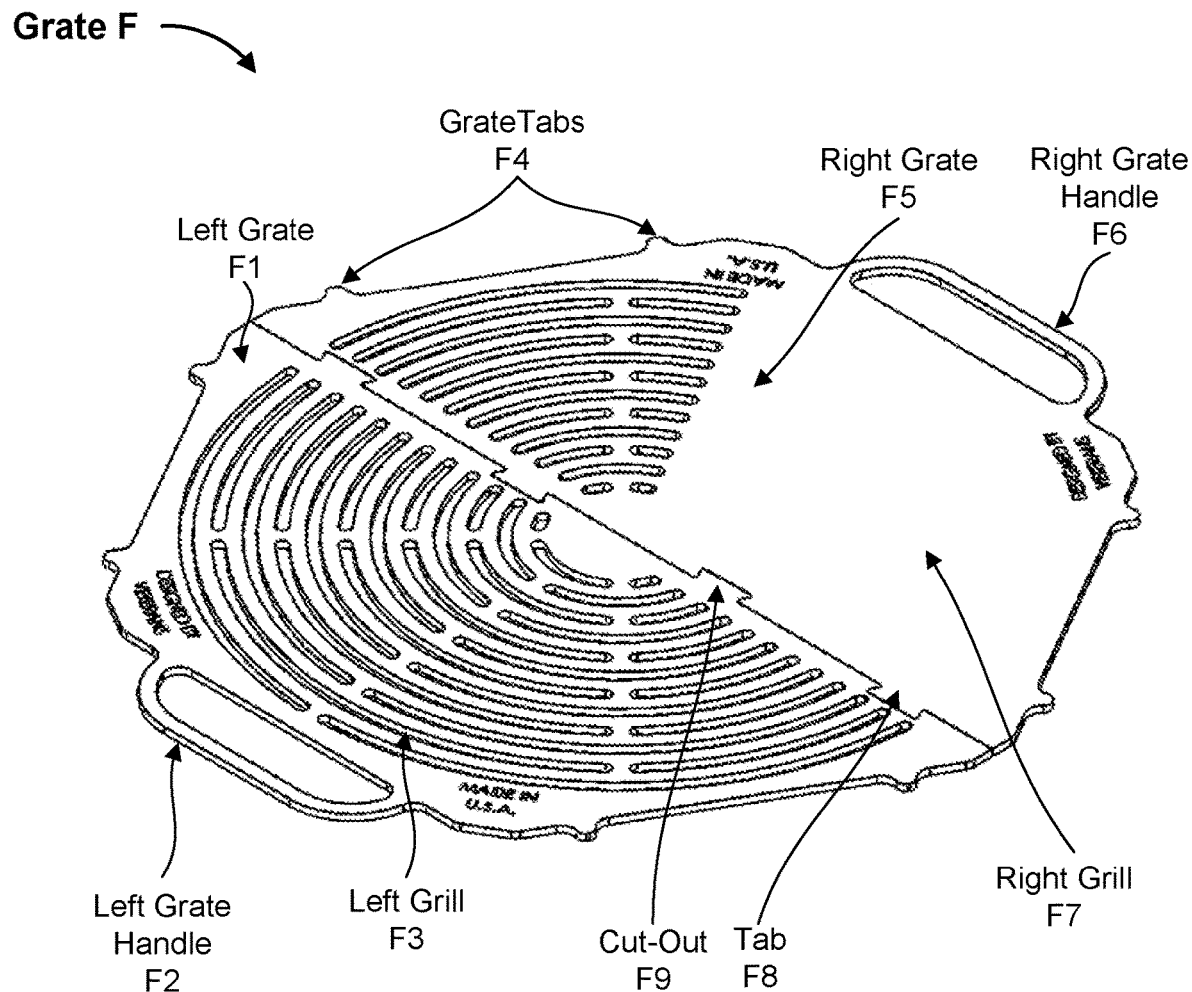
FIG. 7 illustrates a grill grate that rests on top of the fire pit.

FIG. 7 illustrates a grill grate F that rests on top of fire pit 1. Uniquely, grate F has two sides a left grate F1 and a right grate F5 that interlock. As illustrated, the interlock mechanism may be a tab and blank mechanism such that each of the two grate halves has alternating tabs F8 and cut-out regions F9 that fit together like puzzle pieces. In other embodiments, other interlocking mechanisms may be used.

Each grill grate half has a grate handle for picking up or positioning grate F, i.e. left grate F1 has a left grate handle F2 and right grate F5 has a right grate handle F6. Each grate has a grill area. This allows left grade F1 to have a different left grill F3 from right grill F7 which is part of right grate F5. As depicted, the surface area left grill f3 is entirely composed of a circular grill while the surface area of right grill f7 is composed of a circular grill while the other half is composed of a flat continuous surface.

Assembly

Figure 8:
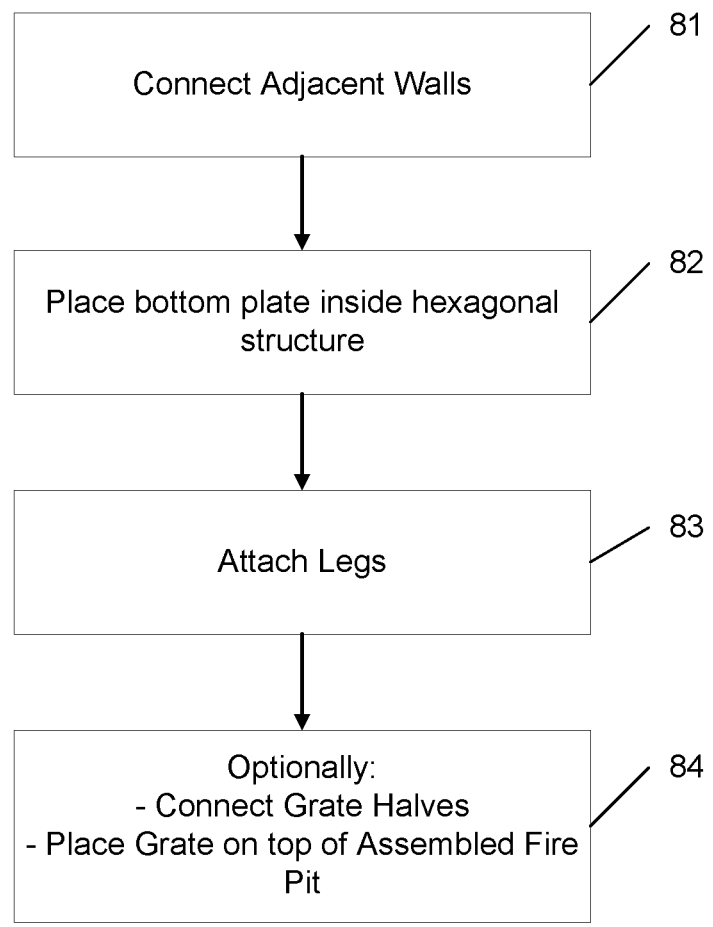
FIG. 8 illustrates a simple method for assembling the fire pit.

FIG. 8 illustrates a simple method 80 for assembling fire pit 1.

At step 81, connect all adjacent walls sequentially All adjacent walls have opposing slots, i.e. wall A is adjacent to wall B and one has a lower slot and one has an upper slot.

At step 82, place bottom plate D inside the hexagonal structure formed by the interlocked walls. It will rest against the tapered walls towards the bottom of the structure.

At step 83, insert each leg E through a wall. Each leg E is inserted through the closed leg slot W2 of a wall such that bottom plate D fits inside the leg slot E3 of the respective leg E.

Optionally, at step 84, place grill grate F on top of the hexagonal structure such that each grate tab F4 fits inside a corresponding cut-out region W5.

Connecting all walls and legs with the floor plate has the effect of locking the entire structure. The structure is easily disassembled in reverse order.

Alternative Embodiments

A variety of materials can be used for each component of fire pit 1. The material used to fabricate a given component, including a wall, leg, bottom plate or grate may be different from or the same as components used for the other components. Typically, a heat and flame resistant material such as steel is used. For example, carbon steel or stainless steel may be used. Other metals, such as titanium, may also be used.

Fire pit 1 can be made in a variety of sizes. For example, a fire pit as small as 0.5 meter diameter and as large as 2 meters diameter are feasible. Here, diameter refers to the distance between two opposing vertices of hexagonal bottom plate D.

In addition, Fire pit 1 may or may not include grate F. Additionally, fire pit 1 may be used with a grate other than grate F. For example, a commercial grill grate that fits over the top of fire pit 1 may be used.

Fire pit 1 is depicted and described as being hexagonal shaped, i.e. having six walls and a hexagonal bottom plate.

However, in other embodiment, fire pit 1 may have a different geometry without departing from the spirit and scope of the invention. For example it may have a different number of sides, e.g. 4, or 8. Further, fire pit 1 is illustrated as having walls of equal width and hence a bottom plate with equal size sides. However, in other embodiments sides may have different widths. For example, three of the sides may have a specific width and the other three sides may be wider.

As previously discussed, other mechanisms for interlocking adjacent walls is also possible. For example, a tab and blank mechanism, as described with reference to FIG. 7, may be used. one embodiment of how two adjacent walls interlock. A hook mechanism where the ends of one side have hooks that fit into holes in an adjacent side is also possible.

Upon reading this disclosure, those of skill in the art will appreciate that while particular embodiments and applications have been illustrated and described herein, the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flat pack fire pit, comprising:
   six planar walls, each planar wall substantially trapezoidal in shape, wherein each wall is vertically oriented with a widest side at the top and a smallest side at the bottom, wherein each wall interconnects with an adjacent wall to form a hexagonal structure, and wherein each wall has a vertically oriented leg slot towards the bottom;
   a hexagonal bottom plate that rests in horizontal orientation inside the hexagonal structure near the bottom; and
   six legs, wherein each leg has a base portion that descends below the hexagonal structure, and a slot portion that protrudes through the leg slot in a corresponding wall, wherein the slot portion has two prongs that fit around an edge of a corresponding side of the bottom plate.

2. The fire pit of claim 1, wherein:
   three of the walls have two upper slots that descend from the top of the widest side of the trapezoidal shaped wall and the other three walls have two lower slots that ascend from the bottom of the narrowest side of the trapezoidal shaped wall, wherein each wall interconnects with an adjacent wall by interlocking an upper slot of one wall with a lower slot of an adjacent wall.

3. The fire pit of claim 1, wherein
   each of the walls, bottom plate and legs are entirely planar, with no folds or bent portions.

4. The fire pit of claim 1, wherein
   each wall includes an enclosed top slot near the top of the wall.

5. The fire pit of claim 1, further comprising:
   a grate that fits on top of the hexagonal structure.

6. The fire pit of claim 5, wherein
   each of the wider edges of the trapezoidal shape of each wall has at least one cut out region, and the grate includes at least one tab that protrudes from its exterior, which fits inside the at least one cut-out region when the grate is placed on top of the hexagonal structure.

7. The fire pit of claim 6, wherein the grate comprises a left grate and a right grate, wherein the left grate and right grate have an interlocking mechanism that interlocks the two sides together.

8. The fire pit of claim 7, wherein the interlocking mechanism consists of alternating tabs and cut-out regions on the left grate and right grate.

\* \* \* \* \*